(12) United States Patent
Govindaraju et al.

(10) Patent No.: US 9,098,282 B2
(45) Date of Patent: Aug. 4, 2015

(54) METHODS, SYSTEMS AND APPARATUS TO MANAGE POWER CONSUMPTION OF A GRAPHICS ENGINE

(71) Applicant: Intel Corporation, Santa Clara, CA (US)

(72) Inventors: Kanivenahalli Govindaraju, Federal Way, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 266 days.

(21) Appl. No.: 13/729,011

(22) Filed: Dec. 27, 2012

(65) Prior Publication Data

US 2014/0189399 A1 Jul. 3, 2014

(51) Int. Cl.
*G06F 1/26* (2006.01)
*G06F 1/32* (2006.01)

(52) U.S. Cl.
CPC ............ *G06F 1/324* (2013.01); *Y02B 60/1217* (2013.01)

(58) Field of Classification Search
None
See application file for complete search history.

(56) References Cited

U.S. PATENT DOCUMENTS

| 8,060,765 B1* | 11/2011 | Cha et al. ..................... 713/322 |
| 2003/0210247 A1 | 11/2003 | Cui et al. |
| 2009/0109230 A1 | 4/2009 | Miller et al. |
| 2011/0131427 A1 | 6/2011 | Jorgenson et al. |
| 2011/0213947 A1 | 9/2011 | Mathieson et al. |
| 2012/0011377 A1* | 1/2012 | Yu et al. ........................ 713/300 |
| 2012/0144215 A1* | 6/2012 | Naffziger et al. ............ 713/320 |
| 2013/0138977 A1* | 5/2013 | Herman et al. ............... 713/300 |

FOREIGN PATENT DOCUMENTS

| CN | 101901042 | 12/2010 |
| JP | 2011141818 | 7/2011 |
| KR | 20110055571 | 5/2011 |
| TW | 200404265 | 3/2004 |
| TW | 201135446 | 10/2011 |

OTHER PUBLICATIONS

David Meisner, et al., "Power Management of Online Data-Intensive Services," ISCA'11, Jun. 4-8, 2011, 12 pages.
Steve Gunther, et al., "Energy-Efficient Computing: Power Management System on the Nehalem Family of Processors," Intel Technology Journal, vol. 14, Issue 3, 2010, 16 pages.

(Continued)

*Primary Examiner* — Paul Yanchus, III
(74) *Attorney, Agent, or Firm* — Hanley, Flight & Zimmerman, LLC

(57) ABSTRACT

Methods and apparatus are disclosed to manage power consumption at a graphics engine. An example method to manage power usage of a graphics engine via an application level interface includes obtaining a policy directive for the graphics engine via the application level interface, the policy directive identifying a threshold corresponding to power consumed by the graphics engine operating in a first graphics state. The example method also includes determining a power consumed by the graphics engine during operation. The example method also includes comparing the power consumed to the threshold of the policy directive, and when the threshold is met, setting the graphics engine in a second graphics state to cause the graphics engine to comply with the policy directive.

19 Claims, 6 Drawing Sheets

(56) References Cited

OTHER PUBLICATIONS

"Energy Efficiency and Power Management Gain Control of Data Center Power," 2 pages, [retrieived from the Internet: http://www.software.intel.com/sites/datacentermanager/index.php on Dec. 3, 2012].

International Searching Authority, "International Search Report and the Written Opinion," issued in connection with corresponding International Application No. PCT/US2013/071219, mailed Mar. 6, 2014 (11 pages).

Intellectual Property Office, "Office Action", issued in connection with Taiwan Patent Application No. 102144280, dated Mar. 17, 2015 (15 pages).

Intellectual Property Office, "Search Report" issued in connection with Taiwan Patent Application No. 102144280, received on Mar. 18, 2015 (2 pages).

* cited by examiner

METHODS, SYSTEMS AND APPARATUS TO MANAGE POWER CONSUMPTION OF A GRAPHICS ENGINE

FIELD OF THE DISCLOSURE

This disclosure relates generally to power management, and, more particularly, to methods, systems and apparatus to manage power consumption of a graphics engine.

BACKGROUND

Media delivery involves complicated operations. As the demand for delivery of online media has increased, performance of corresponding graphics hardware has also had to increase. However, an increase in performance generally corresponds with an increase in power consumption by the graphics hardware.

DETAILED DESCRIPTION

Figure 1:
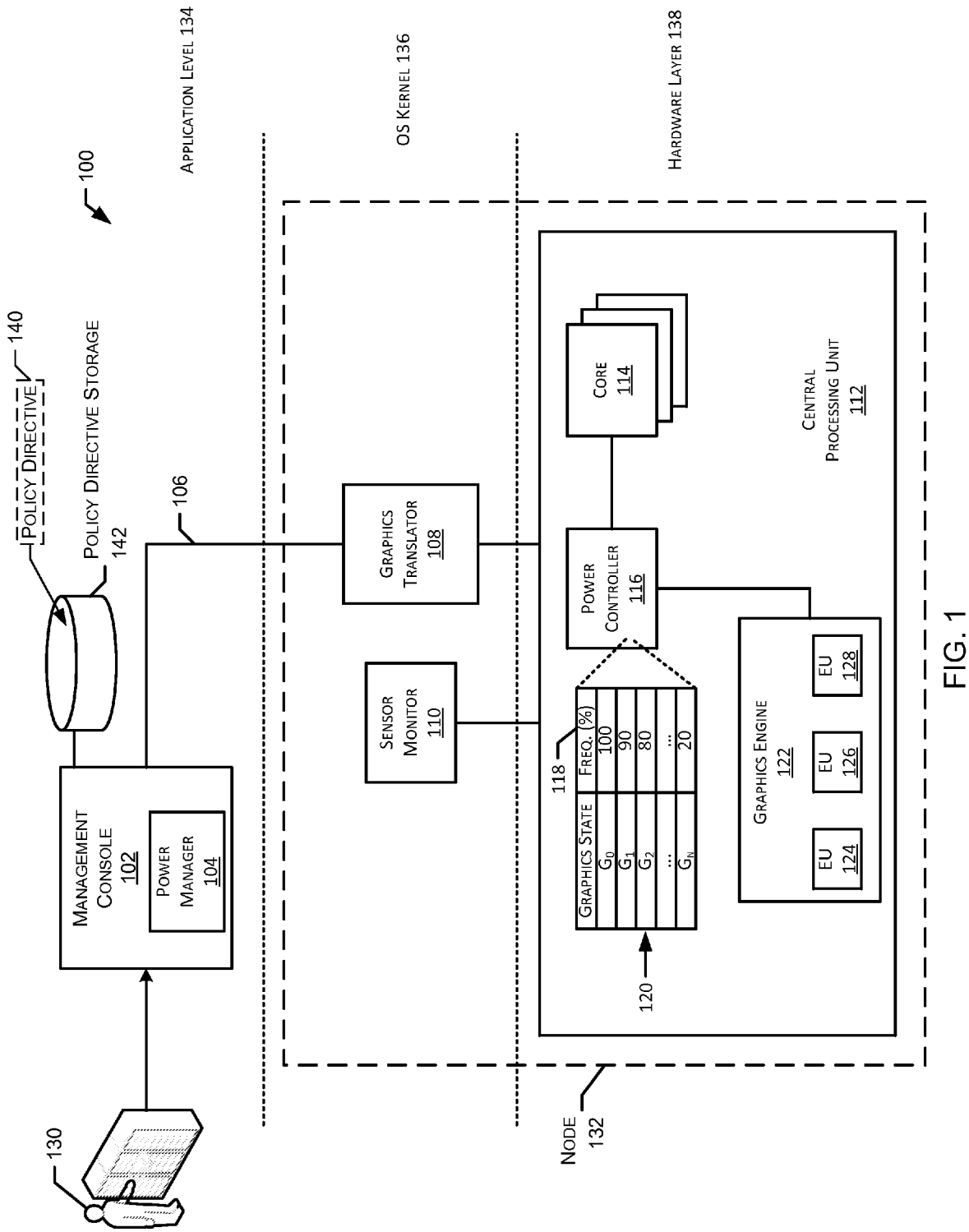
FIG. 1 is a schematic illustration of an example power controller used in an example environment in accordance with the teachings of this disclosure to manage power consumption of a graphics engine.

At least one financial burden of a data center relates to the cost of electricity. As the amount of computing resources used in the data center increases, so too does the cost of electricity/energy to satisfy data processing requirements of the data center. In some data centers, the cost of electricity may account for half of the operating cost of the data center. Thus, managing the power consumed by the data center is of great importance.

Data centers may house hundreds or thousands of servers that may be in rows, in which the rows may be subdivided into racks. Each rack may reflect a collection of servers. Each server typically includes a chipset, which includes a central processing unit (CPU) having integrated graphics hardware or having communicative connection(s) to other graphics hardware (e.g., as part of the chipset). For example, a CPU may include one or more core processors and a graphics processor or a graphics engine.

In some known systems, a graphics workload is communicated from a processing core in the CPU to a graphics driver located in a driver level (or operating system kernel). The graphics driver converts the workload into instructions for the graphics engine included in the CPU. The workload is subdivided into one or more tasks that are executed by execution units (or graphics engine blocks) included in the graphics engine. Some known graphics engines operate in two power states: a processing state (e.g., a graphics state $G_0$) or an idle state (e.g., a graphics state $G_1$). A power state exhibits a discrete combination of voltage and frequency. While in the highest performing power state (e.g., the $G_0$ state), the known graphics engine operates at a high (e.g., the maximum) graphics processing frequency set by, for example, a graphics engine manufacturer. In contrast to the $G_0$ state, when the known graphics engine is in the lower power consumption state (e.g., the $G_1$ state), the graphics engine operates at a baseline graphics processing frequency. As used herein, a "baseline" frequency refers to the frequency the graphics engine operates at while in the idle state. Thus, when the known graphics engine is running a workload (e.g., transcoding a video file), the example graphics driver sets the graphics engine to the $G_0$ state to utilize the high (e.g., maximum) available graphics processing frequency. Consequently, because the known graphics engine is operating at the higher graphics processing frequency, the known graphics engine consumes a higher amount of power. When processing of the workload is completed, information indicative of the completed workload is communicated to the known graphics driver and the graphics driver sets the graphics engine to the $G_1$ state to establish the baseline frequency for the graphics engine. However, the known graphics engine may be able to process the workload at a lower graphics processing frequency without sacrificing processing performance. Thus, unnecessary power is consumed by the known graphics processor while processing a workload.

The power consumed by a graphics engine is proportional to the graphics processing frequency and the square of the voltage used to operate the graphics engine. Thus, in some systems, managing power consumption includes managing the graphics processing frequency and/or the voltage. Manipulating the graphics processing frequency in some systems may be a cumbersome and/or otherwise impractical process. For example, an in-target probe may be used to unlock the processor and then adjust the settings and/or voltage to control a target frequency. However, this method is only available during the processing platform development phase and is not available after the processing platform development and/or execution (operational) phase. Thus, manipulating the graphics processing frequencies corresponding to the graphics state for some systems is not practical in large scale server deployments, such as data centers, cloud deployments or Internet data centers having tens, hundreds or thousands of servers. Example methods, apparatus, systems and/or articles of manufacture disclosed herein provide fine-grain integrated graphics power management at a server, which may then be scaled-out to one or more servers in the large scale server deployment. In other words, example methods, systems and/or articles of manufacture disclosed herein facilitate the fine-grain integrated graphics power management without a need for cumbersome in-target (e.g., in circuit) probe(s).

FIG. 1 is an illustration of an example environment 100 to facilitate fine-grain integrated power management at a server. The example environment 100 of FIG. 1 includes an example management console 102 and an example server or node 132. In some examples, the management console 102 is implemented using multiple devices. For example, the management console 102 may include multiple workstations (e.g., desktop computers, workstation servers, laptops, etc.) in communication with one another. In some examples, the management console 102 operates an operating system. In the illustrated example of FIG. 1, the management console 102 is in communication with the node 132 via one or more wired and/or wireless networks represented by network 106. Example network 106 may be implemented using any suitable wired and/or wireless network(s) including, for example, one or more data buses, one or more Local Area Networks (LANs), one or more wireless LANSs, one or more cellular networks, the Internet, etc. As used herein, the phrase "in communication," including variances thereof, encompasses direct communication and/or indirect communication through one or more intermediary components and does not require direct physical (e.g., wired) communication.

In the illustrated example of FIG. 1, power management of the node 132 occurs at three different levels or layers (e.g., an example application level 134, an example operating system (OS) kernel 136, and an example hardware layer 138).

In the illustrated example of FIG. 1, the application level 134 provides an interface for a user to perform an activity. For example, software or application(s) may run on the application level 134. The example software or application enables a user and/or a profile stored in a memory to execute one or more tasks. For example, a user may utilize a media player at the application level 134 to instruct a node or server to stream a video file. In the illustrated example of FIG. 1, the OS kernel 136 is software (or a collection of software and/or firmware) that acts as a bridge between the application level 134 and the hardware layer 138. In the illustrated example of FIG. 1, the OS kernel 136 includes execution code (or driver(s)) that manage the computing resources of the hardware layer 138. For example, execution code running on the OS kernel 136 may determine when hardware components execute instructions from a program running at the application level 134. In some examples, execution code running at the OS kernel 136 may control or manage specific computing resources. For example, a graphics translator 108 (sometimes referred to as graphics driver) running on the OS kernel 136 receives instructions from the media player running at the application level 134 to stream a video file. The example graphics translator 108 may then instruct an example graphics engine 122 regarding what data to process, when to process that data, how to process that data, etc. In the illustrated example of FIG. 1, the hardware layer 138 includes the hardware components that perform data processing. For example, the graphics engine 122 may take data corresponding to the instructions from the graphics translator 108 and perform video transcoding.

In the illustrated example of FIG. 1, a user 130 such as an Information Technology (IT) professional sets a policy directive 140 for the node 132 (or a component of the node 132 (e.g., the graphics engine 122)) via a program running at the application level 134. For example, the IT professional 130 may input a Service Level Agreement (SLA) for the node 132 (or a component of the node 132) via the management console 102. The example policy directive 140 (or SLA) specifies one or more operating conditions for the node 132. For example, an SLA 140 may specify watts allocated to the node 132 (e.g., a power budget or power cap), a target graphics processing frequency while executing a workload, how long the policy is implemented (e.g., a policy duration), and/or how to address periods when the power budget is violated such as whether to send an alarm or alert, whether to enable a correction period to account for occasional power spikes, what kind of alarm/alert should output if the node 132 (or a component of the node 132) cannot comply with the policy directive 140, etc. (e.g., one or more policy maintenance parameters, conditions or terms). In the illustrated example of FIG. 1, the management console 102 is in communication with a policy directive storage 142 to store one or more policy directives 140. In some examples, the policy directive storage 142 is a memory or database that is in communication with the management console 102 via one or more networks and/or local communication interfaces. In some examples, the policy directive storage 142 is local to the management console 102 and/or integrated therein.

In the illustrated example of FIG. 1, the management console 102 includes a power manager 104. The example power manager 104 is an application or application programming interface (API) that runs on the example management console 102 and facilities an interface for the application level 134. For example, the power manager 104 may include a web services API that allows the IT professional 130 to manage the node 132. In the illustrated example of FIG. 1, the power manager 104 may provide an interface for the IT professional 130 to set one or more policy directives 140 for the example node 132. In some examples, the power manager 104 may retrieve one or more policy directives 140 from the policy directive storage 142 to apply to the node 132. For example, the power manager 104 may vary the power budget for the node 132 based on maintenance parameters retrieved from an example policy directive 140, a schedule (e.g., the time of day), current activity trends (e.g., an increase in workload may cause the power budget to increase), etc. In some examples, the management console 102 may display the current policy directive maintenance parameters (or settings) for the IT professional 130 for review and/or adjustment. In some examples, the power manager 104 may monitor the power consumption of the node 132 and/or allow the IT professional 130 to monitor the power consumption of the node 132. For example, via the power manager 104, the management console 102 may output (e.g., display) periodic, aperiodic, scheduled and/or manual status notifications from the node 132. In still other examples, the management console 102 may output an audible and/or visual alarm or alert when the node 132 fails to comply with the policy directive 140.

In the illustrated example of FIG. 1, the policy directive 140 is communicated from the management console 102 to the node 132 (e.g., via the network 106). At the example node 132, the example policy directive 140 is processed by software, firmware and/or hardware included in the node 132. The example node 132 includes the example graphics translator 108 and an example sensor monitor 110, which operates on the example OS kernel 136, and an example central processing unit (CPU) 112, which operates at the example hardware layer 138. As mentioned above, execution code running on the OS kernel 136 acts as a bridge between programs running at the application level 134 and the hardware components in the hardware layer 138.

In the illustrated example of FIG. 1, the node 132 includes the graphics translator 108, a sensor monitor 110 and a central processing unit (CPU) 112. In some examples, the graphics translator 108 (or graphics driver) is implemented by executable instructions (e.g., software) that translate data or information communicated from the management console 102 to instructions that may be executed and/or otherwise interpreted or implemented by the example CPU 112. For example, a policy directive 140 may include instructions that are communicated to the CPU 112 via the power manager 104 of the management console 102. The example graphics translator 108 may convert the information from the example policy directive 140 into instructions for the example CPU 112 to execute. For example, the graphics translator 108 may communicate to the CPU 112 a power budget set by the IT professional 130 and/or the policy directive 140 for the node 132. In some examples, the graphics translator 108 may translate data or information received from the CPU 112 to information for the power manager 104, such as an output from the CPU 112 indicative of whether the example policy directive 140 is being satisfied or being violated. The example graphics translator 108 may translate the indication from the example CPU 112 into information for the example power manager 104 to output as a status notification of whether the example policy directive 140 is not being satisfied (e.g., via an alarm or alert) or is being satisfied (e.g., via an acknowledgement, the absence of an alarm or alert). Example instances where the node 132 fails to comply with the policy directive 140 include the node 132 consuming an amount of power or energy that is greater than a threshold (e.g., a minimum value).

In some examples, the sensor monitor 110 monitors one or more sensors coupled to hardware components included in the hardware layer 138 and determines a current profile and/or status of the hardware components (e.g., the power controller 116, the graphics engine 122, etc.). For example, the sensor monitor 110 may gather current power information from one or more power sensors coupled to the CPU 112 and determine the instant power consumed by the CPU 112 based on the gathered information. In some examples, the sensor monitor 110 outputs an indication corresponding to the power consumed, such as a range of power consumed over one or more periods of time.

In the illustrated example of FIG. 1, the CPU 112 operates as a hardware component located in the example hardware layer 138, or operates as a virtual machine controlled by a virtual machine monitor communicatively connected to the example management console 102. In some examples, the CPU 112 communicates with programs running at the application level 134 and/or with execution code running on the OS kernel 136. The example CPU 112 may also facilitate communicating information between other hardware components at the hardware layer 138, such as retrieving information recorded in a memory and conveying that to one or more graphics engines.

In the illustrated example of FIG. 1, the CPU 112 includes one or more cores (or processors) 114, a power controller 116 and a graphics engine 122, including execution units (EU) 124, 126 and 128. In the illustrated example of FIG. 1, the core 114 reads and writes instructions from the program manager 104, the graphics translator 108 and/or the sensor monitor 110. In some examples, the core 114 receives information from a program running at the application level 134 (e.g., the example power manager 104) and/or from instructions (e.g., software) running on the OS kernel 136 (e.g., the example graphics translator 108). The example core 114 may determine which component to communicate information to based on the type of information. For example, the core 114 may receive instructions from the graphics translator 108 corresponding to settings of the example policy directive 140. As a result, the example core 114 communicates information corresponding to settings of the example policy directive 140 to the example power controller 116. For example, the core 114 communicates a change in the power budget for the graphics engine 122 to the power controller 116.

In the illustrated example of FIG. 1, the power controller 116 manages and/or otherwise configures the power consumed by the graphics engine 122. As described above, rather than the graphics engine 122 operating in either the $G_0$ state or the $G_1$ state, the power controller 116 contains one or more additional or alternate graphics states, and each graphics state may operate at a different frequency. Consequently, each example graphic state corresponds to a different amount of power consumption by the example graphics engine 122. In the illustrated example of FIG. 1, the power controller 116 includes a data structure 118 (e.g., a table, a bit array, etc.) that specifies a frequency at which the graphics engine 122 operates as a percentage of a maximum frequency that the graphics engine 122 can handle. For example, when the example graphics engine 122 is set to the example $G_2$ state, the graphics engine 122 operates at 80 percent of the maximum operating frequency of the graphics engine 122 (see row 120).

In some examples, the number of graphics states and the corresponding frequencies are generated based on an analysis of historical power consumption during operation (e.g., while executing a workload). For example, monitoring the power consumption of the graphics engine 122 over a two week period may reveal that the graphics engine 122 operates a majority of the time in one of three energy levels (e.g., power consumption levels, frequency levels, etc.). In some examples, these energy levels may be converted into frequencies or frequency levels. The example graphics states stored in the example data structure 118 of FIG. 1 are modified to correspond to the power consumption frequencies. In other words, the example data structure 118 may be updated to record three graphics states, each with a frequency corresponding to power consumption by the example graphics engine 122 at or near one of the three power consumption levels. In some examples, a data structure 118 reflects the maintenance parameters (or terms or conditions) of a policy directive 140. Each example policy directive 140 may include any number of example data structures 118. For example, a policy directive 140 may include a first data structure 118 with graphics states to execute during peak hours and a second data structure 118 with graphics states to executing during off-peak hours.

The example graphics engine 122 of FIG. 1 processes any type of graphical workload. For example, the graphics engine 122 may perform video file transcoding, in which the graphics engine 122 receives instructions to transcode the video file, and the workload is divided amongst the execution units 124, 126, 128 of the graphics engine 122. While the example graphics engine 122 of FIG. 1 includes three execution units 124, 126, 128, example methods, systems and/or articles of manufacture disclosed herein may include any number of execution units, which may vary based on the type of the graphics engine. However, the speed at which the example execution units 124, 126, 128 transcode the video file depends on the example graphics state set by the example power controller 116.

Figure 2:
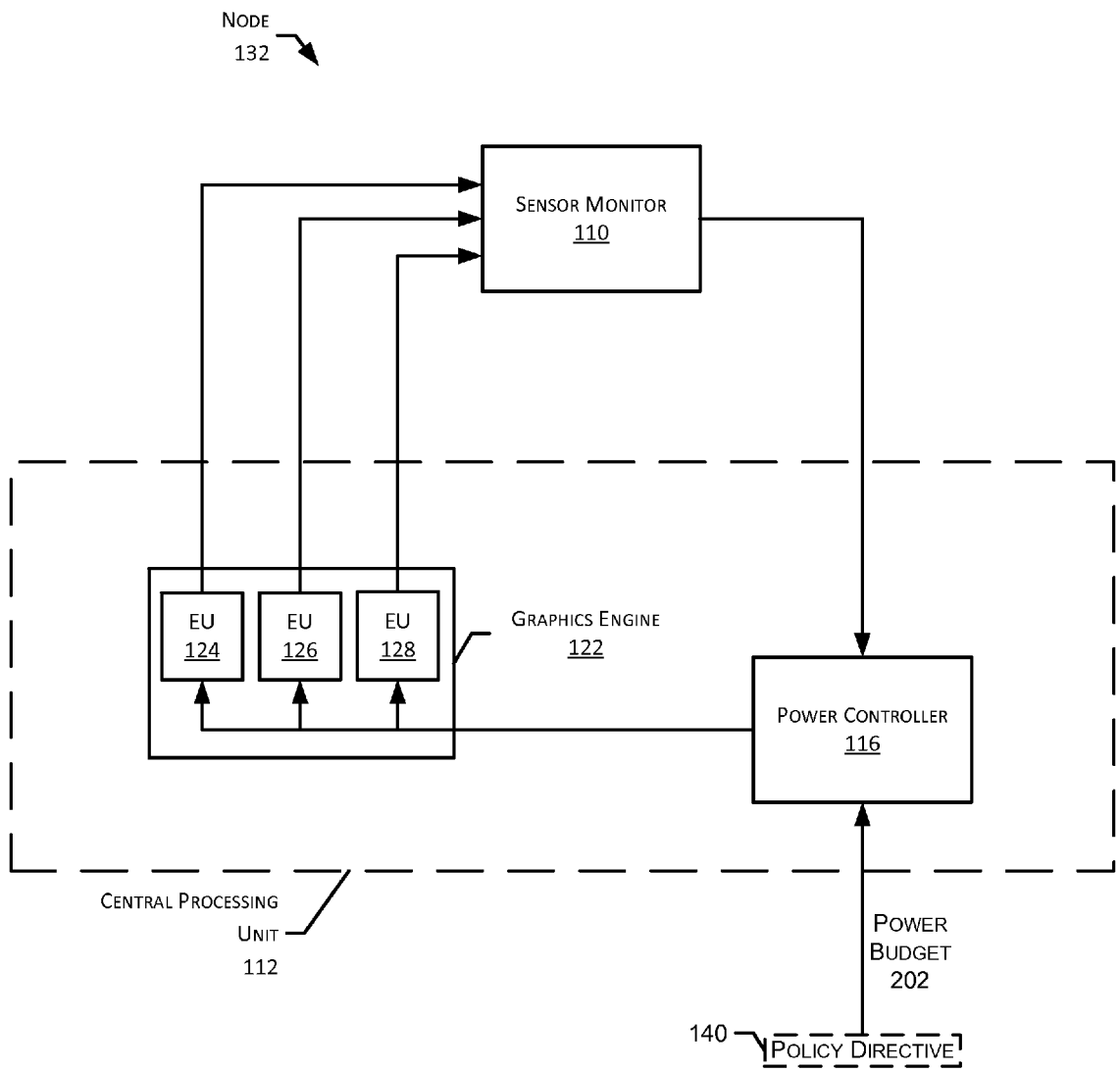
FIG. 2 is a block diagram of an example node in the example environment of FIG. 1.

FIG. 2 is a block diagram of the example node 132 of FIG. 1. In the illustrated example of FIG. 2, the power controller 116 sets the graphics state of the graphics engine 122 based on information corresponding to the policy directive 140. For example, the power controller 116 may receive information corresponding to a power budget 202 (e.g., threshold) for the graphics engine 122 (e.g., an upper limit for the power consumed by the graphics engine 122) as defined by the policy directive 140 and/or one or more data structures 118. In some examples, the power budget 202 for the graphics engine 122 may be set directly by a user 130 (e.g., the IT professional) via software running at the application level 134 (e.g., the power manager 104). In some examples, the power budget 202 for the graphics engine 122 may be indirectly set by the IT professional 130. For example, the IT professional 130 may set a single power budget for two or more nodes (e.g., a group power budget), and the power budget 202 for the graphics engine 122 may be set by the power manager 104. In still other examples, the power budget 202 may be set by one or more policy directives 140 accessed by the example power manager 104 on a manual, scheduled and/or aperiodic basis.

In the illustrated example of FIG. 2, the power controller 116 sets a graphics state for the graphics engine 122 to execute a workload while complying with the power budget 202. In some examples, the power controller 116 compares the consumption (e.g., power consumption, frequency value, etc.) of each graphics state to the power budget 202 and selects the consumption value closest to the power budget 202 without consuming more power than that power budget 202 allows. In some examples, the power controller 116 may set the graphics engine 122 to a default (or predetermined) graphics state. For example, when the graphics engine 122 receives a workload to execute (e.g., instructions to transcode a video file), the power controller 116 may set the graphics engine 122 to the $G_2$ state without comparing the power consumption at the $G_2$ state to the power budget 202. In some examples, the power controller 116 may set the graphics engine 122 to a graphics state based on historical information. For example, the power controller 116 may determine that the graphics engine 122 executes a majority of received workloads while set to the $G_3$ state. Thus, the example power controller 116 may set the graphics engine 122 to the $G_3$ state. In some examples, the power controller 116 may set the graphics engine 122 to the graphics state in which the graphics engine 122 completed executing a previous workload. In some examples, the power controller 116 may determine that the graphics engine 122 can execute the workload and satisfy the power budget 202 while varying the graphics state of one or more execution units 124, 126, 128 included in the graphics engine 122. For example, the graphics engine 122 may complete executing a workload and remain below the power budget 202 while the execution unit 124 is set to the $G_2$ graphics state and the execution units 126, 128 are set to, for example, the $G_3$ graphics state. Thus, the example power controller 116 facilitates completing workloads based on the computing resources available and/or the power budget 202 set for the graphics engine 122.

In the illustrated example of FIG. 2, based on the graphics state set by the power controller 116, the graphics engine 122 executes the workload at one or more corresponding frequencies. In some examples, one or more sensors may be coupled to and/or positioned near one or more of the execution units 124, 126, 128. For example, sensors able to measure power consumption may be positioned near the execution units 124, 126, 128. In the illustrated example of FIG. 2, the sensor monitor 110 gathers information collected by sensors positioned at or near the execution units 124, 126, 128 corresponding to the power consumed by each execution unit 124, 126, 128 while executing one or more tasks and/or calculates an instant power consumed by the graphics engine 122. In some examples, the sensor monitor 110 may communicate the instant power to the power controller 116 consumed by the graphics engine 122 as a feedback loop to be corrected based on the power budget 202. In other examples, the sensor monitor 110 may communicate that the instant power consumed is between ranges of one or more power consumption thresholds.

In the illustrated example of FIG. 2, the power controller 116 compares the instant power consumption values retrieved from the sensor monitor 110 with one or more values or maintenance parameters associated with the policy directive 140 (e.g., the power budget 202 for the graphics engine 122). Based on the result of the comparison, the example power controller 116 determines whether to make adjustments to the currently set graphics state of the example graphics engine 122. For example, when the instant power consumption reaches and/or exceeds the power budget 202, the power controller 116 may determine adjustments to make to the graphics state(s) at which the graphics engine 122 operates to satisfy the power budget 202. For example, the power controller 116 may set one or more of the execution units 124, 126, 128 to a lower power consumption graphics state (e.g., throttle the graphics processing frequency of one or more of the execution units 124, 126, 128). In some examples when the power consumption is less than the power budget 202, the power controller 116 may execute actions to increase the workload performed by the graphics engine 122. In some examples, the power controller 116 may modulate the graphics state of the graphics engine 122 between two graphics states to facilitate satisfying a power budget 202. For example, the power budget 202 for the graphics engine 122 may be more than the power consumption of the graphics engine 122 while operating in the $G_3$ state, but less than the power consumption of the graphics engine 122 while operating in the $G_2$ state. In such examples, the average power consumption of the graphics engine 122 caused by switching between, for example, the $G_2$ state and the $G_3$ state over a period of time, may satisfy the power budget 202.

Whether modulating the graphics state is an acceptable adjustment depends on the maintenance parameters (or terms) of the policy directive 140 set by, for example, the IT professional 130. The example policy directive 140 may indicate that the instant power consumption cannot exceed (e.g., meet) the power budget 202 at any time during operation under the policy directive 140. In some examples, the policy directive 140 may include a correction period. For instance, the policy directive 140 may indicate that the instant power consumption and/or the average power consumption of the graphics engine 122 cannot exceed the power budget 202 over a duration of one second. That is, if the example power controller 116 is unable to make adjustments to the instant power consumption and/or the average power consumption of the example graphics engine 122 to satisfy the power budget 202 within one second of exceeding the power budget 202, the power controller 116 may output an indication that the graphics engine 122 cannot comply with or satisfy the currently implemented power budget 202 and/or policy directive 140. In some examples, when the instant power consumption and/or the average power consumption of the graphics engine 122 exceeds the power budget 202, a correction period timer is invoked by the power controller 116. The example power controller 116 may monitor the instant power consumption and/or the average power consumption for the correction period and adjust the graphics state(s) of the graphics engine 122 when the correction period timer expires or the instant power consumption and/or the average power consumption complies with the power budget 202.

The example power controller 116 may determine that operating the example graphics engine 122 is unable to satisfy the maintenance parameters of the example policy directive 140 when the power budget 202 is less than the power consumed by the graphics engine 122 while operating at the baseline frequency. In some examples, the policy directive 140 may set a lower (e.g., minimum) limit for the power consumed by the graphics engine 122 that is less than the power consumed by the graphics engine 122 while operating at higher (e.g., maximum) graphics processing frequency. In some such examples when the power controller 116 determines the graphics engine 122 is unable to satisfy the maintenance parameters of the policy directive 140, the power controller 116 outputs, for example, an alarm indication. In such examples, the graphics translator 108 of FIG. 1 may receive the alarm indication and communicate the indication to the power manager 104 to output an alarm for the IT professional 130 and/or a log file of node 132 performance. For example, the power manager 104 interface may change colors, a pop-up window may appear on the power manager 104 interface, etc.

In this manner, the example power controller 116 monitors and/or configures power configurations (e.g., frequency configurations) of the example graphics engine 122 to comply with the power budget 202. Additionally, by selecting graphics states with the lowest power consumption while still satisfying the power budget 202, the power consumption of the graphics engine 122 may be reduced by tens or hundreds of watts over time, and, thereby, reduce the cost of maintaining or operating the node 132.

As described above, the example power controller 116 of FIGS. 1 and 2 sets a graphics state for the example graphics engine 122 to operate in a manner consistent with one or more policy directives 140 controlled by and/or otherwise accessible to the power manager 104. The example power controller 116 selects one or more graphics states based on the maintenance parameters (or terms) of the policy directive 140 (e.g., the power budget 202) and the power consumption corresponding to each of the graphics states. The example power controller 116 also compares the instant power consumed by the example graphics engine 122 while processing a workload to the power budget 202. Based on the comparison, the example power controller 116 may adjust one or more graphics states (e.g., graphics processing frequencies) of the example graphics engine 122. As a result, the example power controller 116 enables the example graphics engine 122 to process the workload while also consuming less power, which reduces the power consumed by the node 132 by tens or hundreds of watts over time. To make the node power management of FIG. 2 more useful, the power management can be scaled out to collectively manage power consumption on any number of nodes 132 (e.g., servers, cores, processors, computer processing units).

Figure 3:
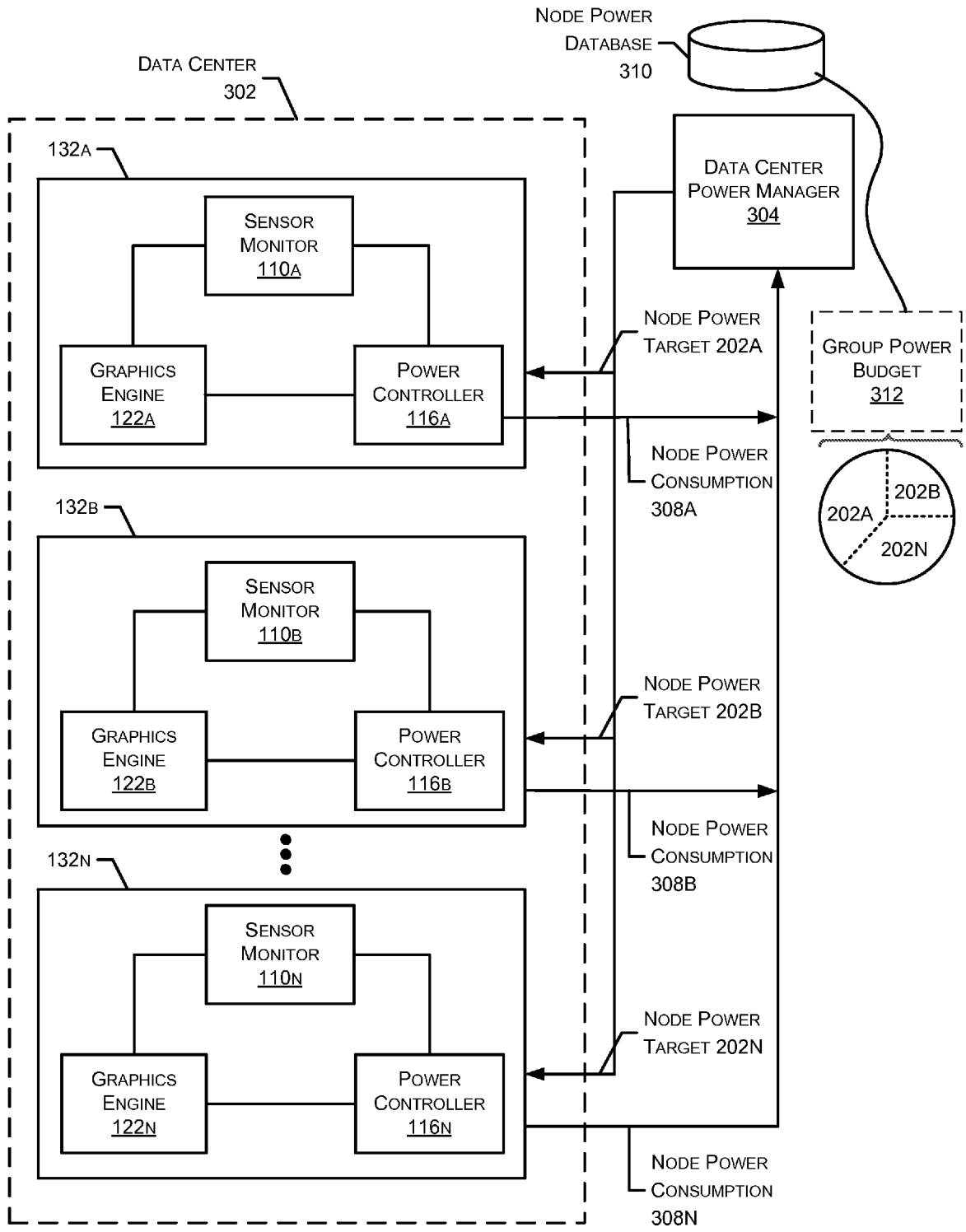
FIG. 3 is a block diagram of an example data center in the example environment of FIG. 1.

FIG. 3 is a block diagram of an example data center 302 having two or more nodes. In the illustrated example of FIG. 3, the data center 302 includes n nodes 132A, 132B . . . 132N. Each of the example nodes 132A, 132B . . . 132N operates similarly to the example node 132 of FIGS. 1 and 2. For example, each node 132A, 132B . . . 132N in FIG. 3 includes a respective power controller 116A, 116B . . . 116N, a respective graphics engine 122A, 122B . . . 122N and a respective sensor monitor 110A, 110B . . . 110N. In the illustrated example of FIG. 3, each node 132A, 132B . . . 132N is in communication with a data center power manager 304. In some examples, the data center power manager 304 is an application level 134 program similar to the program manager 104 of FIG. 1. In some examples, the data center power manager 304 includes an interface that a user (e.g., an IT professional 130) can use to set one or more policy directives 140. In such examples, the IT professional 130 may set the policy for a single node 132 or for a group of nodes 132A, 132B . . . 132N (e.g., two or more nodes). For example, the IT professional 130 may set a policy directive 140 for one or more racks of nodes 132A, 132B . . . 132N (e.g., servers) included in the data center 302. In such examples, the policy directive 140 is a cumulative (or group) policy directive rather than a policy directive for a single node 132. In some examples, the data center power manager 304 allows the IT professional 130 to monitor the power consumption of the nodes 132A, 132B . . . 132N included in the data center 302. For example, the data center power manager 304 may output information corresponding to the power consumption of each node 132A, 132B . . . 132N and/or a group of nodes 132A, 132B . . . 132N. For example, the data center power manager 304 may indicate the status of a group of nodes 132A, 132B . . . 132N operating under a first policy directive, a group of nodes 132A, 132B . . . 132N operating under a second policy directive, and the status of nodes 132A, 132B . . . 132N not operating under a policy directive.

In the illustrated example of FIG. 3, the data center power manager 304 manages and/or configures the power consumed by the nodes 132A, 132B . . . 132N of the data center 302 based on the maintenance parameters of one or more policy directives 140 currently operating in the data center 302. Based on the computing resources available at each node 132A, 132B . . . 132N included in the policy directive 140, the example data center power manager 304 communicates a node power budget 202A, 202B . . . 202N for each respective node 132A, 132B . . . 132N. For example, the highest performing power state (e.g., the $G_0$ state) may vary for one or more nodes 132A, 132B . . . 132N. Thus, rather than communicate uniform node power budgets (e.g., based on a group power budget 312 and the number of nodes included in the group) to the nodes 132A, 132B . . . 132N, the example data center power manager 304 may calculate a separate node power budget 202A, 202B . . . 202N for each node 132A, 132B . . . 132N that, when combined over all of the nodes 132A, 132B . . . 132N, satisfies the group power budget 312. In the illustrated example of FIG. 3, the group power budget 312 and the node power budgets 202A, 202B . . . 202N are stored in a node power database 310, which is in communication with the data center power manager 304.

In the illustrated example of FIG. 3, the node power budgets 202A, 202B . . . 202N provided by the data center power manager 304 are processed by each respective node 132A, 132B . . . 132N using a similar process as described in FIG. 2. For example, the power controller (e.g., the power controller 116A) determines what computing resources are available at the graphics engine (e.g., graphics engine 122A) and aggregates the instant node power consumed by the graphics engine 122A. In some examples, the power controller 116A outputs the instant node power consumed to the data center power manager 304.

In the illustrated example of FIG. 3, the data center power manager 304 may sum the instant node power consumed 308A, 308B . . . 308N by each node 132A, 132B . . . 132N and compare the summed value to the group power budget 312. Using a similar process as described in FIG. 2, the example data center power manager 304 may adjust the node power budgets 202A, 202B . . . 202N based on one or more comparison results. In this manner, the example data center power manager 304 manages the power consumed by the one or more nodes 132A, 132B . . . 132N of interest. As the power management process described in FIG. 2 may reduce power consumption of a node by tens or hundreds of watts over time, the data center power management process described in FIG. 3 may reduce the power consumption of a data center by tens or hundreds of kilowatts over time.

While an example manner of implementing the example node 132 and management console 102 is illustrated in FIGS. 1-3, one or more of the elements, processes and/or devices illustrated in FIGS. 1-3 may be combined, divided, re-arranged, omitted, eliminated and/or implemented in any other way. Further, the example power manager 104, the example network 106, the example graphics translator 108, the example sensor monitor 110, the example CPU 112, the example core 114, the example power controller 116, the example graphics engine 122, the example execution units 124, 126, 128, the example policy directive storage 142, the example data center 302, the example data center power manager 304, the example node power database 310 and/or, more generally, the example node 132 and example management console 102 of FIGS. 1-3 may be implemented by hardware, software, firmware and/or any combination of hardware, software and/or firmware. Thus, for example, any of the example power manager 104, the example network 106, the example graphics translator 108, the example sensor monitor 110, the example CPU 112, the example core 114, the example power controller 116, the example graphics engine 122, the example execution units 124, 126, 128, the example policy directive storage 142, the example data center 302, the example data center power manager 304, the example node power database 310 and/or, more generally, the example node 132 and example management console 102 of FIGS. 1-3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example management console 102, the example power manager 104, the example network 106, the example graphics translator 108, the example sensor monitor 110, the example CPU 112, the example core 114, the example power controller 116, the example graphics engine 122, the example execution units 124, 126, 128, the example node 132, the example policy directive storage 142, the example data center 302, the example data center power manager 304 and/or the example node power database 310 are hereby expressly defined to include a tangible computer readable storage medium such as a memory, DVD, CD, Blu-ray storing the software and/or firmware. Further still, the example node 132 and example management console 102 of FIGS. 1-3 may include one or more elements, processes and/or devices in addition to, or instead of, those illustrated in FIGS. 1-3, and/or may include more than one of any or all of the illustrated elements, processes and devices.

Figure 4:
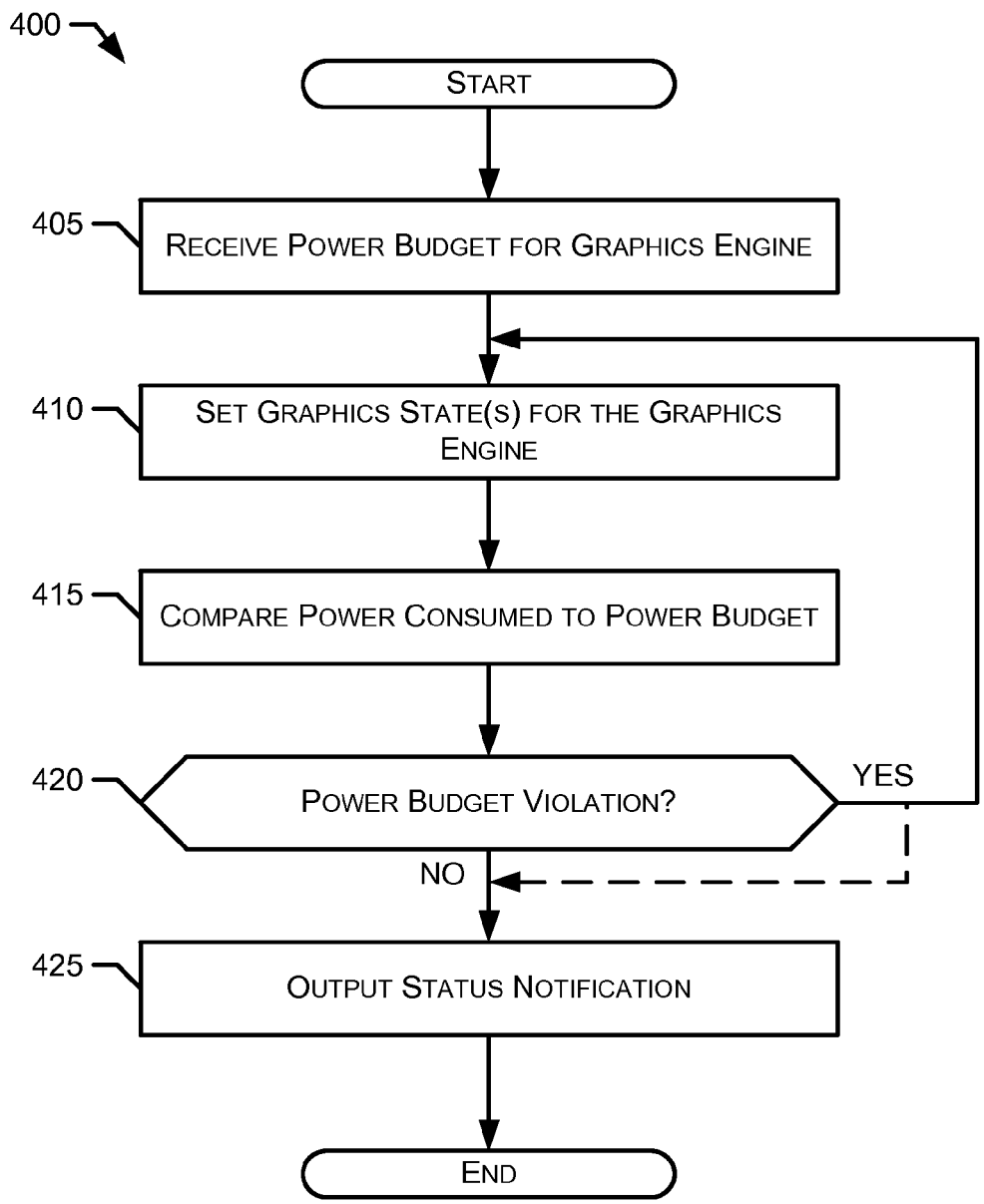
FIGS. 4 and 5 are flowcharts representative of example machine readable instructions which may be executed to manage power consumption.
Figure 5:
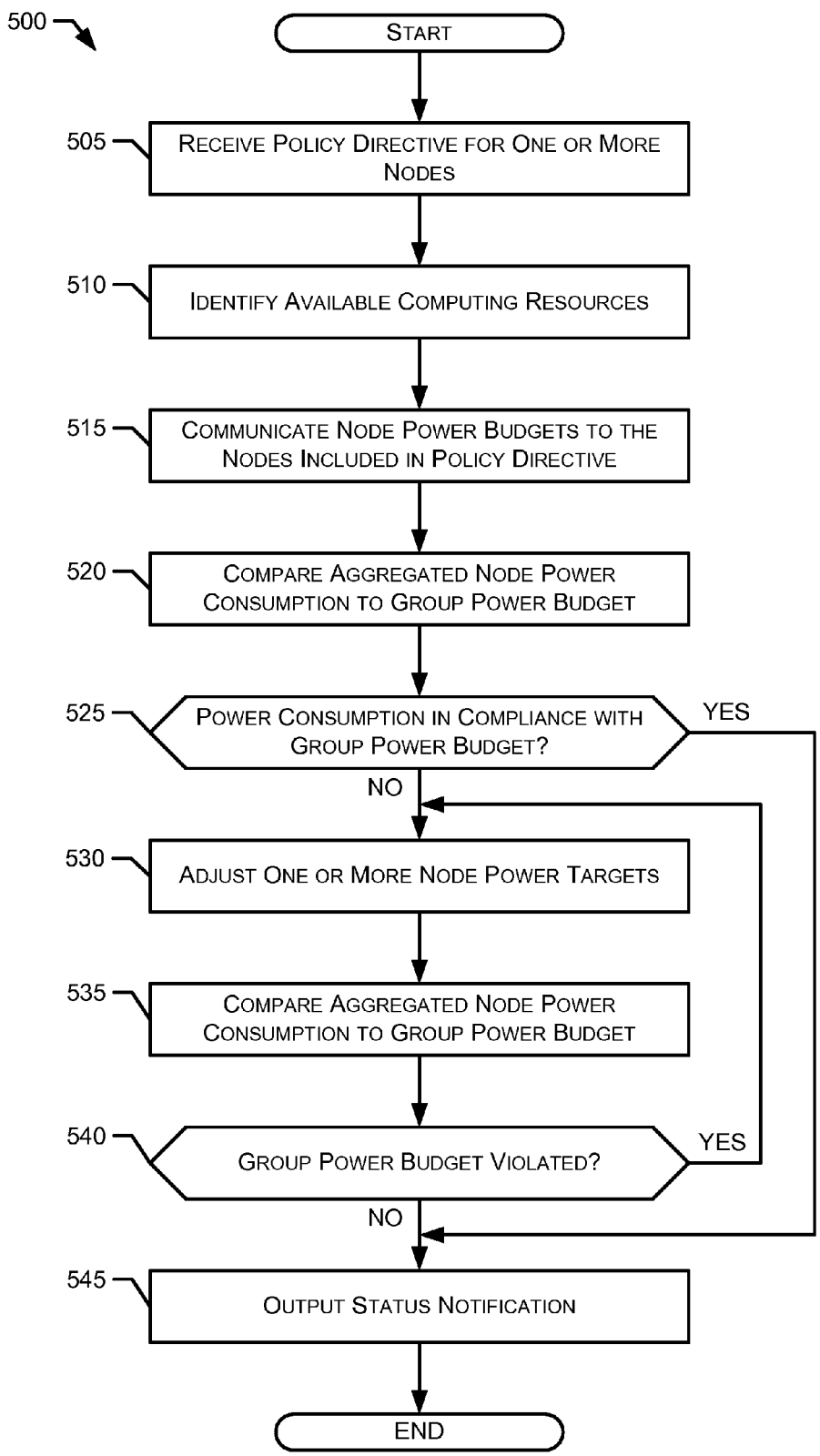

Flowcharts representative of example machine readable instructions for implementing the node 132 and management console 102 of FIGS. 1-3 are shown in FIGS. 4 and 5. In these examples, the machine readable instructions comprise programs for execution by a processor such as the processor 612 shown in the example processing platform 600 discussed below in connection with FIG. 6. The programs may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example programs are described with reference to the flowcharts illustrated in FIGS. 4 and 5, many other methods of implementing the node 132 and management console 102 of FIGS. 1-3 may alternatively be used. For example, the order of execution of the blocks may be changed, and/or some of the blocks described may be changed, eliminated, or combined.

The example processes of FIGS. 4 and 5 may be implemented using coded instructions (e.g., computer readable instructions) stored on a tangible computer readable storage medium (e.g., a computer readable storage device or storage disk) such as a hard disk drive, a flash memory, a read-only memory (ROM), a compact disk (CD), a digital versatile disk (DVD), a cache, a random-access memory (RAM) and/or any other physical storage structure in which information is stored for any duration (e.g., for extended time periods, permanently, brief instances, for temporarily buffering, and/or for caching of the information). Additionally or alternatively, the example processes of FIGS. 4 and 5 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable storage medium. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

In the illustrated example of FIG. 4, the power controller 116 manages the power consumed by the graphics engine 122 of the node 132. The program 400 of FIG. 4 begins by the example power controller 116 receiving and/or otherwise retrieving a power budget 202 for the graphics engine 122 (block 405). As described above, the example power budget 202 is a maintenance parameter (or term or setting) of a policy directive 140 (e.g., set by a user, an IT professional 130, etc.). The power budget 202 is an upper limit of power that the graphics engine 122 and/or each of the example execution units 124, 126, 128 can consume, which may be represented as a percentage of the maximum frequency that the example graphics engine 122 can handle. In some examples, the power budget 202 is set (e.g., by a stored policy directive 140, by the IT professional 130) directly for the graphics engine 122, while in other examples, the group power budget 312 is set for a group of nodes 132A, 132B . . . 132N. Additionally, the example data center power manager (e.g., the data center power manager 104, 304) may determine one or more node power budget(s) 202A, 202B . . . 202N (e.g., a power budget) for the graphics engine 122.

Based on the power budget 202, the example power controller 116 sets one or more graphics states for the example graphics engine 122 (block 410). For example, the power controller 116 may set a different graphics state for one or more of the execution units 124, 126, 128 of the graphics engine 122. Each graphics state may correspond to a different percentage of the maximum frequency of the example graphics engine 122 and, consequently, to a different power consumption. Based on the computing resources (e.g., execution units 124, 126, 128) available to process a workload, the example power controller 116 selects one or more graphics states for the graphics engine 122.

While the example graphics engine 122 is processing a workload, the example power controller 116 compares the instant power consumed by the graphics engine 122 with the power budget 202 (block 415). For example, the sensor monitor 110 may gather information corresponding to power consumed from one or more sensors positioned near the execution units 124, 126, 128. The example sensor monitor 110 may sum the values and provide the instant power consumed by the example graphics engine 122 to the example power controller 116.

When the power consumed by the example graphics engine 122 complies with the power budget 202 (block 420), the power controller 116 outputs a status notification (block 425). For example, the power controller 116 may output an acknowledgement signal that the graphics engine 122 is operating in compliance with the power budget. The example program 400 of FIG. 4 then ends.

When the power consumed by the example graphics engine 122 is not in compliance (e.g., violates) the power budget 202 (block 420), the example power controller 116 may make adjustments to the one or more graphics states of the graphics engine 122. For example, control may return to block 410 to set one or more execution units 124, 126, 128 to a lower power consuming graphics state. In some examples, the power controller 116 may attempt to set the one or more graphics states to comply with the power budget a specified number of times.

In some examples, the power controller 116 may output a status notification when the graphics engine 122 is not in compliance with the power budget 202 (block 420) or if the power controller 116 is unable to adjust the power consumption of the graphics engine 122 to comply with the power budget 202. For example, the power controller 116 may output an alarm or alert to output at the management console 102. The example program 400 of FIG. 4 then ends.

In the illustrated example of FIG. 5, the power consumed by one or more nodes (or servers) is monitored and/or adjusted. The example program 500 of FIG. 5 begins when an example data center power manager 304 receives and/or otherwise retrieves a policy directive 140 (block 505). For example, an IT professional 130 may apply a service level agreement (SLA) to a rack of nodes 132 in a data center 302. The example SLA provides an example group power budget 312 for the rack of nodes 132A, 132B . . . 132N. The example data center power manager 304 determines what resources are available to the data center power manager 304 to execute a workload (block 510). For example, one or more nodes 132A, 132B . . . 132N included in the rack may already be processing a workload, and thus, are already set to a graphics state and consuming power. However, these nodes 132 may not be operating at maximum frequency (e.g., the $G_0$ state). Thus, the example data center power manager 304 identifies what computing resources (e.g., nodes 132A, 132B . . . 132N) are available to process the workload, and then communicates node power budgets 202A, 202B . . . 202N to the nodes 132A, 132B . . . 132N included in the group power budget 312 (block 515). The node power budgets 202A, 202B . . . 202N are the power budgets that the example respective power controller 116A, 116B . . . 116N attempts to comply with. The instant node power consumption 308A, 308B . . . 308N from each example power controller 116A, 116B . . . 116N is aggregated by the example data center power manager 304 from each of the nodes 132A, 132B . . . 132N and compared to the group power budget 312 (block 520).

When the aggregated power consumption of the example nodes 132A, 132B . . . 132N is in compliance with the example group power budget 312, control proceeds to block 545 and the data center power manager 304 outputs a status notification (e.g., a compliance acknowledgement) (block 545). The example program 500 of FIG. 5 then ends.

When the aggregated power consumption of the example nodes 132A, 132B . . . 132N is not in compliance with the example group power budget 312 (e.g., the group power budget 312 is violated) (block 525), the data center power manager 304 adjusts the node power budgets for each node 132 based on the comparison (block 530). For example, the data center power manager 304 may adjust the node power budget 202A for the graphics engine 122A of the node 132A to a node power budget 202A corresponding to a lower power consumption. The example data center power manager 304 again compares the aggregated node power consumption after the adjusted node power budgets 202A, 202B . . . 202N were communicated to the respective example nodes 132A, 132B . . . 132N to the group power budget 312 (block 535). When the aggregated node power consumption is in compliance with the group power budget 312 (block 540), the example data center power manager 304 outputs a status notification (e.g., a compliance acknowledgement) (block 545) and the example program 500 of FIG. 5 then ends.

When the aggregated node power consumption does not comply with the example group power budget 312 (block 540), control may return to block 530 and the example data center power manager 304 may again attempt to adjust one or more node power budgets 202A, 202B . . . 202N. In some examples, the data center power manager 304 may attempt to adjust the aggregated node power consumption to comply with the group power budget 312 a specified number of times. When the number of attempts reaches the specified number, the example data center power manager 304 may output a status indication that the nodes included in the group power budget 312 cannot comply with the group power budget 312 (block 545). For example, the data center power manager 304 may output an alarm or alert indication. Additionally, the example data center power manager 304 may output an alarm or alert when the aggregated power consumption of the nodes 132 does not comply with the group power budget. In some examples, the data center power manager 304 may output no acknowledgement when the aggregated power consumption complies with the group power budget, but may output an alarm or alert when the aggregate power consumption of the nodes 132 does not comply with group power budget.

Figure 6:
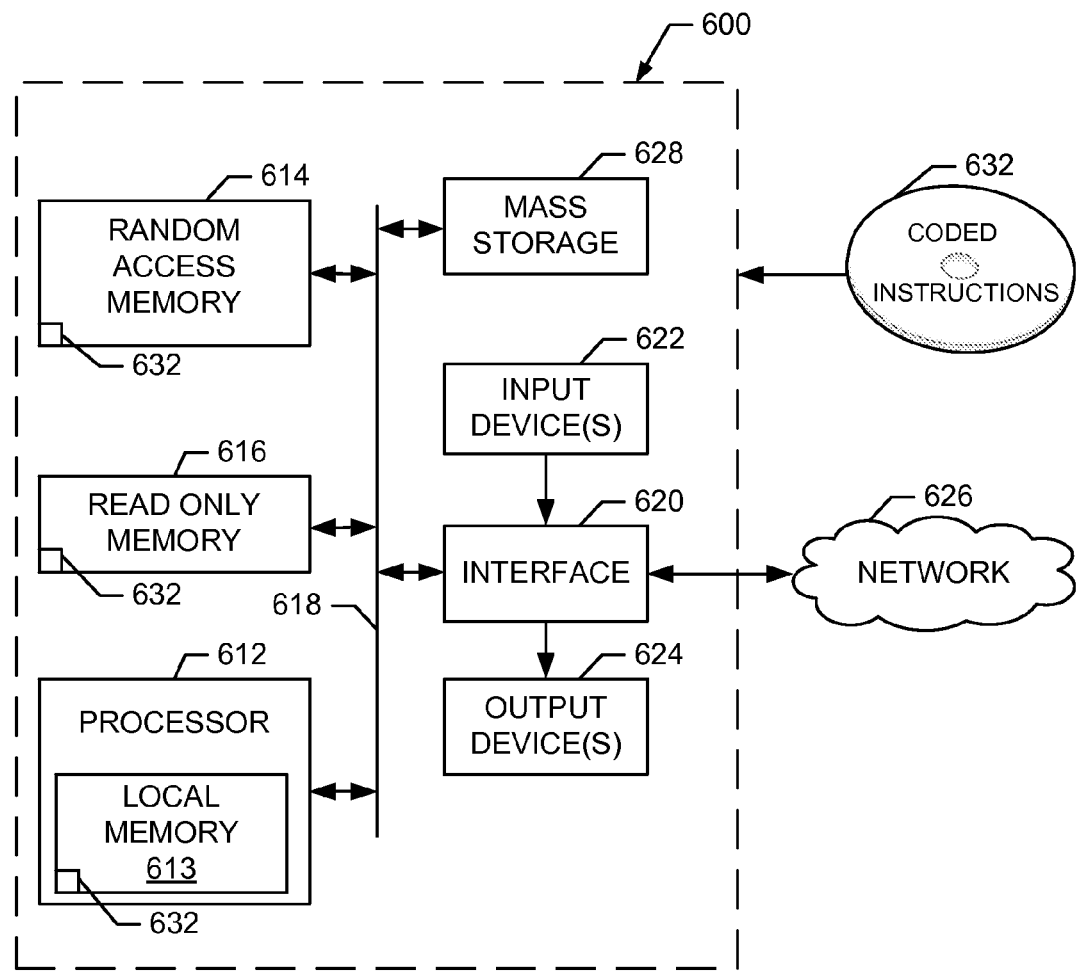
FIG. 6 is a schematic illustration of an example processor platform that may execute the instructions of FIGS. 4 and 5 to implement the example systems and apparatus of FIGS. 1-3.

FIG. 6 is a block diagram of an example processing platform 600 capable of executing the instructions of FIGS. 4 and 5 to implement the node 132 and management console 102 of FIGS. 1-3. The processing platform 600 can be, for example, a server, a personal computer, an Internet appliance, or any other type of computing device.

The processing platform 600 of the instant example includes a processor 612. For example, the processor 612 can be implemented by one or more microprocessors or controllers from any desired family or manufacturer.

The processor 612 includes a local memory 613 (e.g., a cache) and is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processing platform 600 also includes an interface circuit 620. The interface circuit 620 may be implemented by any type of interface standard, such as an Ethernet interface, a universal serial bus (USB), and/or a PCI express interface.

One or more input devices 622 are connected to the interface circuit 620. The input device(s) 622 permit a user to enter data and commands into the processor 612. The input device(s) can be implemented by, for example, a keyboard, a mouse, a touchscreen, a track-pad, a trackball, isopoint and/or a voice recognition system.

One or more output devices 624 are also connected to the interface circuit 620. The output devices 624 can be implemented, for example, by display devices (e.g., a liquid crystal display, a cathode ray tube display (CRT), a printer and/or speakers). The interface circuit 620, thus, typically includes a graphics driver card.

The interface circuit 620 also includes a communication device such as a modem or network interface card to facilitate exchange of data with external computers via a network 626 (e.g., an Ethernet connection, a digital subscriber line (DSL), a telephone line, coaxial cable, a cellular telephone system, etc.).

The processing platform 600 also includes one or more mass storage devices 628 for storing software and data. Examples of such mass storage devices 628 include floppy disk drives, hard drive disks, compact disk drives and digital versatile disk (DVD) drives. The mass storage device 628 may implement a local storage device.

Coded instructions 632 representative of the machine readable instructions of FIGS. 4 and 5 may be stored in the mass storage device 628, in the volatile memory 614, in the non-volatile memory 616, and/or on a removable storage disc such as a CD or DVD.

Methods, systems and apparatus are disclosed to manage power consumption of a graphics engine. Some disclosed example methods include obtaining a policy directive for a graphics engine via an application level interface, the policy directive identifying a threshold corresponding to power consumed by the graphics engine operating in a first graphics state, determining a power consumed by the graphics engine during operation, comparing the power consumed to the threshold of the policy directive, and when the threshold is met, setting the graphics engine in a second graphics state to cause the graphics engine to comply with the policy directive. Other disclosed example methods include summing a plurality of power values from a plurality of execution units in the graphics engine. Other disclosed example methods include generating a notification in response to setting the second graphics state. Other disclosed example methods include invoking a correction period timer in response to meeting the threshold of the policy directive. Other disclosed example methods include monitoring the power consumed by the graphics engine for the correction period prior to setting the graphics engine in the second graphics state.

Example systems to manage power usage of a graphics engine via an application level interface include a node power controller to obtain a policy directive set for the graphics engine via the application level interface, the policy directive identifying a threshold of power usage for a first graphics state of the graphics engine, and a sensor monitor to sense a power usage by the graphics engine, the node power controller to compare the power usage to the threshold of the policy directive, and when the threshold is satisfied, the node power controller is to set the graphics engine to a second graphics state to cause the graphics engine to comply with the policy directive. Other disclosed example systems include the graphics engine comprising an execution unit to execute a task received via the application level interface. Other disclosed example systems include the node power controller to generate a notification in response to setting the second graphics state. Other disclosed example systems include the node power controller to invoke a correction period timer in response to satisfaction of the threshold of the policy directive. Other disclosed example systems include the node power controller to monitor the power usage by the graphics engine for the correction period prior to setting the graphics engine in the second graphics state.

Some disclosed example machine readable storage mediums include instructions that, when executed, cause a machine to at least obtain a policy directive for a graphics engine via an application level interface, the policy directive identifying a threshold corresponding to power consumed by the graphics engine in a first graphics state, to determine a power consumed by the graphics engine during operation, to compare the power consumed to the threshold of the policy directive, and when the threshold is met, to set the graphics engine in a second graphics state to cause the graphics engine to comply with the policy directive. Some example machine readable storage mediums include summing a plurality of power values from a plurality of execution units in the graphics engine. Other example machine readable storage mediums include generating a notification in response to setting the second graphics state. Other disclosed example machine readable storage mediums include invoking a correction period timer in response to meeting the threshold of the policy directive. Other disclosed example machine readable storage mediums include monitoring the power consumed by the graphics engine for the correction period prior to setting the graphics engine in the second graphics state. Other disclosed example machine readable storage mediums include calculating an average power usage by the graphics engine for the correction period and set the graphics engine in the second graphics state when the average power usage meets the threshold.

From the foregoing, it will be appreciated that the above disclosed methods, apparatus and articles of manufacture enable fine-grain power management of power consumption in a node including an integrated graphics engine, and that the fine-grain power management can be scaled out and used in a large scale server deployment Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to manage power usage of a graphics engine via an application level interface, comprising:
    obtaining a policy directive for the graphics engine via the application level interface, the policy directive identifying a threshold corresponding to a permissible amount of power to be consumed by the graphics engine when operating in a first graphics state;
    determining a power consumed by the graphics engine during a first time of operation;
    comparing the power consumed during the first time of operation to the threshold of the policy directive;
    invoking a correction period timer if the threshold of the policy directive is satisfied by the power consumed during the first time of operation, the correction period timer defining a correction period;
    monitoring the power consumed by the graphics engine during the correction period;
    after the correction period, comparing the power consumed during the correction period to the threshold of the policy directive; and
    when the threshold of the policy directive is satisfied by the power consumed during the correction period, setting the graphics engine in a second graphics state to cause the graphics engine to comply with the policy directive.

2. A method as described in claim 1, wherein determining the power consumed by the graphics engine during the first time includes summing a plurality of power values from a plurality of execution units in the graphics engine.

3. A method as described in claim 2, wherein the first graphics state of the graphics engine corresponds to a first frequency configuration of at least one of the plurality of execution units.

4. A method as described in claim 2, wherein the second graphics state of the graphics engine corresponds to a second frequency configuration of at least one of the plurality of execution units.

5. A method as described in claim 1, further including generating a notification of the graphics engine entering the second graphics state.

6. A method as described in claim 1, further including calculating an average power consumed by the graphics engine during the correction period, and setting the graphics engine in the second graphics state when the average power consumed during the correction period satisfies the threshold.

7. A method as described in claim 1, wherein setting the graphics engine in the second graphics state includes selecting the second graphics state from a data structure that specifies a frequency at which the graphics engine operates as a percentage of a maximum frequency of the graphics engine.

8. A system to manage power usage of a graphics engine via an application level interface, comprising:
a node power controller to obtain a policy directive for the graphics engine via the application level interface, the policy directive identifying a threshold of permissible power usage by the graphics engine when operating in a first graphics state; and
a sensor monitor to sense power usage by the graphics engine during a first time of operation, the node power controller to compare the power usage during the first time of operation to the threshold of the policy directive, the node power controller to invoke a correction period timer if the threshold of the policy directive is satisfied by the power usage by the graphics engine during the first time, the correction period timer defining a correction period, the sensor monitor to sense power usage by the graphics engine during the correction period, the node power controller to compare, after the correction period, the power usage during the correction period to the threshold of the policy directive, and when the threshold of the policy directive is satisfied by the power usage during the correction period, the node power controller to instruct the graphics engine to enter a second graphics state to cause the graphics engine to comply with the policy directive, at least one of the node power controller or the sensor monitor implemented via a logic device.

9. A system as described in claim 8, wherein the graphics engine includes an execution unit to execute a task received via the application level interface.

10. A system as described in claim 9, wherein the first graphics state of the graphics engine corresponds to a first frequency configuration of the execution unit.

11. A system as described in claim 9, wherein the second graphics state of the graphics engine corresponds to a second frequency configuration of the execution unit.

12. A system as described in claim 8, wherein the node power controller is to generate a notification of the graphics engine entering the second graphics state.

13. A system as described in claim 8, the node power controller to calculate an average power usage by the graphics engine during the correction period, the node power controller to set the graphics engine in the second graphics state when the average power usage during the correction period satisfies the threshold.

14. A system as described in claim 8, wherein the node power controller is to select the second graphics state from a data structure that specifies a frequency at which the graphics engine operates as a percentage of a maximum frequency of the graphics engine.

15. A machine readable storage device or storage disk comprising instructions that, when executed, cause a machine to at least:
obtain a policy directive for a graphics engine via an application level interface, the policy directive identifying a threshold corresponding to a permissible amount of power to be consumed by the graphics engine when operating in a first graphics state;
determine a power consumed by the graphics engine during a first time of operation;
compare the power consumed during the first time of operation to the threshold of the policy directive;
invoke a correction period timer if the threshold of the policy directive is satisfied by the power consumed during the first time of operation, the correction period timer defining a correction period;
monitor the power consumed by the graphics engine during the correction period;
after the correction period, compare the power consumed during the correction period to the threshold of the policy directive; and
when the threshold of the policy directive is satisfied by the power consumed during the correction period, set the graphics engine in a second graphics state to cause the graphics engine to comply with the policy directive.

16. A machine readable storage device or storage disk as described in claim 15, wherein the instructions, when executed, cause the machine to determine the power consumed by the graphics engine during the first time by summing a plurality of power values from a plurality of execution units in the graphics engine.

17. A machine readable storage device or storage disk as described in claim 15, wherein the instructions, when executed, cause the machine to generate a notification of the graphics engine entering the second graphics state.

18. A machine readable storage device or storage disk as described in claim 15, wherein the instructions, when executed, cause the machine to calculate an average power consumed by the graphics engine during the correction period, and the instructions set the graphics engine in the second graphics state when the average power consumed during the correction period satisfies the threshold.

19. A machine readable storage device or storage disk as described in claim 15, wherein the instructions, when executed, cause the machine to select the second graphics state from a data structure that specifies a frequency at which the graphics engine operates as a percentage of a maximum frequency of the graphics engine.

* * * * *